TAPE DECK FOR NON-REWINDING TAPE RECORDER

Filed April 29, 1958

INVENTOR.
JOSEPH A. MACSINGER
BY
Milburn & Milburn
ATTORNEYS

United States Patent Office 2,944,825

Patented July 12, 1960

2,944,825

TAPE DECK FOR NON-REWINDING TAPE RECORDER

Joseph A. MacSinger, Cleveland, Ohio, assignor, by mesne assignments, to Small Business Administration, Washington, D.C., an agency of the United States Government Filed Apr. 29, 1958, Ser. No. 731,807

10 Claims. (Cl. 274—4)

This invention relates to the class of devices that are popularly known as tape recorders.

My present invention, more particularly, relates to that type of tape recorder in which the tape is in the form of a single non-rewinding roll so as to have a movement in the same direction at all times without the necessity of re-winding; and my present improvement might be conveniently referred to as a tape deck for such a device.

As is of course well known, such an apparatus includes a cartridge of magnetized tape upon which the sound record is made and from which it is played back; and the cartridge of tape is capable of being removably installed so as to permit it to be removed from the apparatus and replaced by another cartridge of tape. In this way, any recorded tape may be played back at any time and a cartridge of fresh tape may be inserted for recording. Such a device is provided also with means for erasing a sound record from the tape so as to permit it to be used again. This same general manner of operation is contemplated in the present case and it is of course understood that, as the cartridge of tape is placed in position for operation, a portion of the tape itself must be placed in proper relation to the recording and reproducing means and this portion of the tape must be removed from such operative relation when the cartridge is removed. It is this part of the present-day device upon which my present invention is an improvement; that is, the insertion and removal of a cartridge and the positioning and removal of the tape with respect to the recording and reproducing means within the apparatus. Therefore, since the present invention does not involve any change in the present-day electrical means for recording and reproducing sound, such structure is not herein shown. It is to be understood also that my present invention is here illustrated in connection with a particular form of cartridge which is already known and which itself is not new with me.

Accordingly, the object of my present invention is to provide such a device in which the manner of inserting and removing the cartridge of tape is simplified as compared with prior devices of the general character above referred to.

More specifically, the present invention contemplates such a device in which the cartridge of tape is moved into and is removed from operative position by a single, continuous sliding movement thereof and the tape itself is automatically placed in and removed from operative position with respect to the recording and reproducing means during such sliding movement of the cartridge into and out of position.

Other objects will appear from the following description and claims when considered together with the accompanying drawing.

The type of cartridge, in connection with which my present invention is herein illustrated, will be indicated below.

Figures 1, 2, 3, 5, 6:
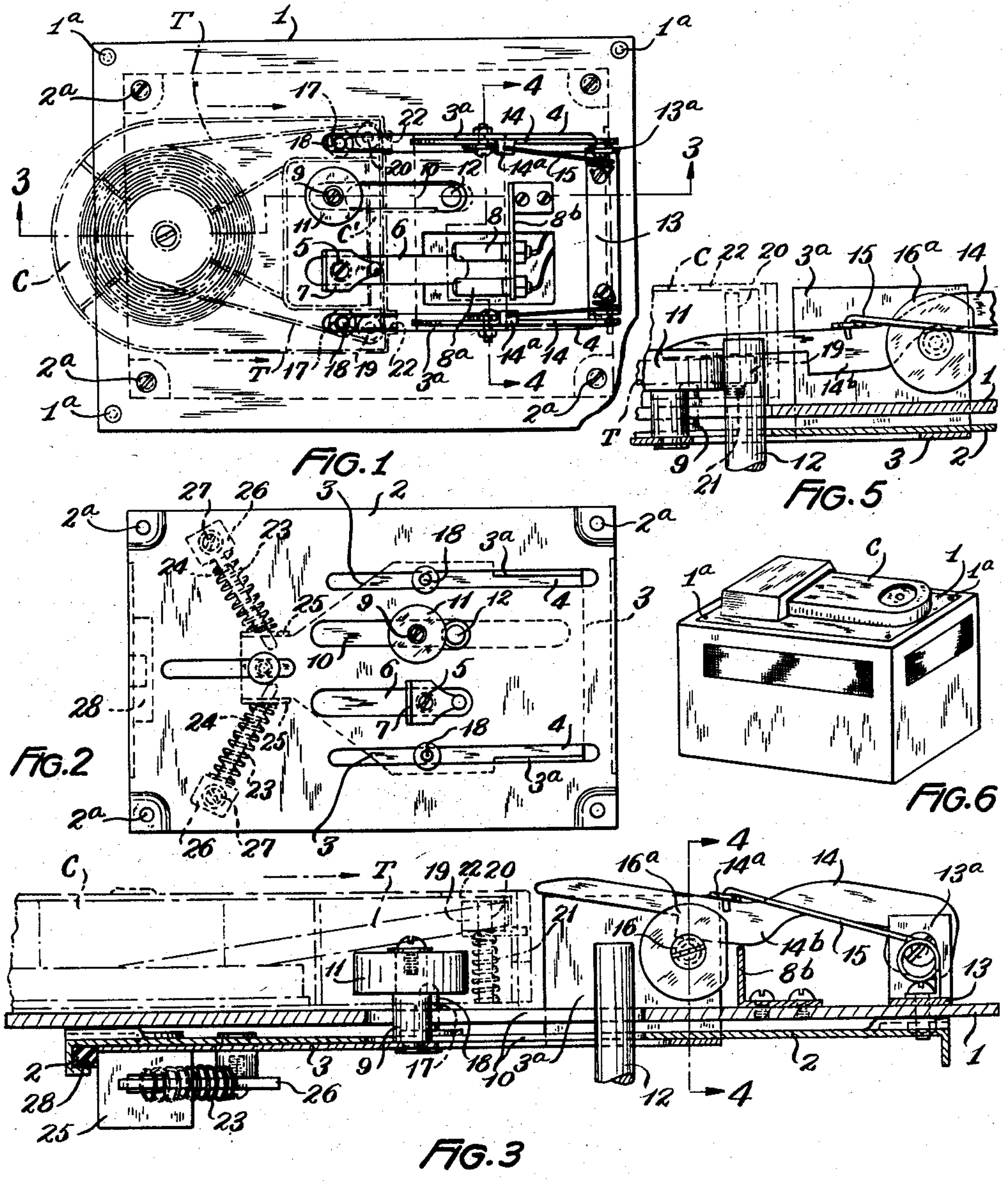
Fig. 1 is a top plan view of my present device and shows the cartridge of tape in preliminary position and ready to be slid into operative position.
Fig. 2 is a top plan view with the top plate removed so as to better show the position of some of the parts when in operative position.
Fig. 3 is a sectional view taken on line 3—3 of Fig. 1 with the parts in inoperative position and indicates the means by which the tape is automatically placed and held in operative position with respect to the recording and play-back head as the cartridge is slid into position.
Fig. 5 is a partial sectional view corresponding to Fig. 3 but with the cartridge in forward or operative position.
Fig. 6 is a perspective view illustrating in a general way an entire tape recorder of which the present invention may form a part, the front part of the present mechanism being here shown with a cover which is omitted in the other views hereof.
Figure 4:
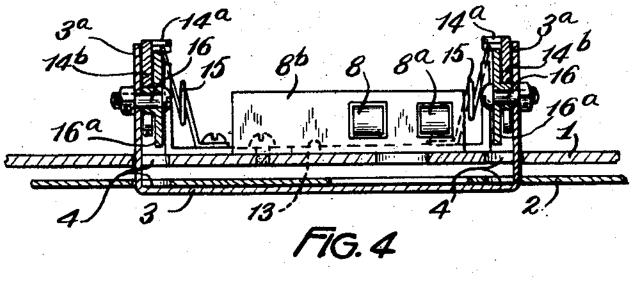
Fig. 4 is a sectional view taken on line 4—4 of Fig. 3.

Referring now to the accompanying drawing in detail, the top plate 1 of my present improvement is adapted to be attached by means of screws to the top of the casing (Fig. 6), which houses the electrical motor and its connections and other mechanism that form part of the tape recorder and that operate in the same general manner as in other such devices; and my present invention comprises mechanism that is attached to the top plate 1 so as to constitute a unit that may be referred to as a tape deck. The top plate 1 has screw holes **1*a* as a convenient means for attaching the same to the top of the casing. The guide plate 2 is screwed at 2*a* to the under-side of the top plate 1 in slightly spaced relation thereto so as to accommodate the connections of operating parts to be hereinafter referred to. The plate 3 is slidably mounted closely upon the under-side of the plate 2 and has integral bracket arms 3*a* extending up through registering slots 4 in the plates 1 and 2. The slide plate 3 has an upwardly extending shaft 5 which projects through registering slots 6 in the plates 1 and 2 and upon which the tape pressure assembly 7 is mounted for co-operation with the magnetic recording and play-back head 8 or with the erasing head 8*a* on the bracket 8*b* at the opposite side of the tape T. The slide plate 3 has a fixed shaft 9 extending up through the registering slots 10 in the plates 1 and 2 and has mounted thereupon the idle roller 11 of hard rubber for freely rotatable movement. The roller 11 is adapted to be moved into and out of operative position with respect to the capstan drive 12 from the electric motor, with the substantially tangential stretch of the tape T engaged between the roller 11 and the fly-wheel capstan drive shaft 12. The capstan drive 12 extends up through a fixed bearing in an under-plate (not shown) that is connected to the regular assembly of the structure within the casing of the tape recorder and to which the plate 2 may be secured by screws (not shown). The three plates 1, 2 and 3** may all be formed as metal stampings.

Fixedly mounted upon the forward end of the top plate 1 is the bracket 13 with upward extensions **13*a* at its two ends upon which are pivotally mounted the opposite rocker arms 14 for positioning a tangential portion of the tape T with respect to the operating mechanism as the cartridge C is slid into operative position. The arms 14 are urged downwardly by the wire springs 15 which are each mounted at one end thereof upon the bracket 13 and have engagement at the other end in the inward projection 14*a* of the arm 14. These arms 14 extend rearwardly in the form of fingers that are adapted to engage the upper edge of the tangential portion of the tape T in a vertical plane and to move it down into operative position as the cartridge C is slid into operative position. That is, the forward sliding movement of the cartridge C will automatically cause the arms 14 to engage the tangential portion of the tape T with a downward movement as it is slid into position beneath the ends of the arms 14 and to thus place and hold the tape T in operative engagement between the idler 11 and the capstan drive shaft 12; and, upon rearward sliding movement of the cartridge C for withdrawal of the same, the arms 14** will be automatically raised so as to permit the tape T to return to inoperative position within the cartridge C.

While the arms 14 are normally urged downwardly by the springs 15, they are adapted to be raised by engagement of their downwardly extending portions 14b by the projections 16 that extend inwardly from the opposite bracket arms 3a of the slide plate 3. Each projection 16 has an inner enlarged head 16a spaced from its bracket arm 3a so as to provide guide slots for the arms 14.

The cartridge, which is herein illustrated in a general way and which may be made of plastic, has a pair of apertures 17 in the bottom and near the forward end thereof for engagement over the correspondingly located pins 18 that extend upwardly from the slide plate 3 through the registering slots 4 in the plates 1 and 2. The tape T is adapted to extend about the idle spools 19 that are urged upwardly upon their vertically disposed pins 20 within the cartridge C by coil springs 21 arranged thereabout beneath the spools 19. The forward end of the cartridge C is provided at the two sides thereof with the vertical slots 22 that are in the path of the rear finger ends of the arms 14 and that extend over the inner parts of the spools 19 so as to permit downward engagement of the arms 14 thereupon when the cartridge C is slid into operative position.

The slide plate 3 is held in rearward idle position and in forward operative position by the pair of coil springs 23 that surround the pressure bars 24 and have abutment at their ends with the downwardly extending flanges 25 on the slide plate 3, through which flanges the bars 24 extend, and with the squared ends 26 of the bars 24 pivotally mounted upon the sleeves that surround the screws 27 in the plate 2. These springs 23 are so angularly arranged that their inner ends will pass dead center as the slide plate 3 is moved from rearward to forward position, and vice versa, so as to maintain plate 3 in either position to which it is moved. The rear end of the slide plate 3, at the limit of its rearward movement, will have engagement with the cushioning means 28 in the form of a rubber block that is secured within the rear edge of the plate 2.

In the type of apparatus for which the present invention is particularly adapted, the forward end of the cartridge C is open at its under-side so as to accommodate the tape pressure assembly 7 and the roller 11 that are positioned therebeneath when the cartridge C is in position upon the tape deck. The cartridge body C may be recognized as having a substantially square front end, parallel sides at right angles to the front end, and a curved rear end within which the tape T is housed; and, with the open under-side at the front end of the cartridge body, it may be recognized as having parallel forward hollow side portions through which the tape T passes and within which the spools 19 are located. The front ends of the hollow side portions of the cartridge body C are connected by a channel portion C' that is open at its under-side so as to permit the front tangential stretch of the tape T to be lowered therefrom by the fingers 14 and to be returned thereinto by the springs 21 in the manner above described. The cartridge body C is of substantially flat form and may be readily grasped by one hand of the user and slid forwardly by a single continuous movement into operative position and can be moved rearwardly out of such position by a reverse continuous sliding movement preparatory to removing the cartridge from the tape deck. As will be seen, such sliding movement of the cartridge into and out of position will automatically effect the institution and cessation of the recording and reproducing, respectively, of the sound. And, with the automatic positioning of the tape T for operation and likewise the automatic withdrawal of the tape T from position back into the cartridge C preparatory to removal of the cartridge C, the entire manipulation and positioning of the cartridge and the tape T is greatly simplified and expedited, it being possible to effect the complete change from one cartridge to another in about two seconds. Also, with the present invention, the cartridge is effectively locked in operative position and such positioning and withdrawal of the cartridge is accomplished in a positive and dependable manner. Furthermore, my present improvement can be produced as a unit and applied as such to the type of device for which intended.

Other advantages will be obvious to those who are familiar with the art to which the present invention relates; and it is to be understood that the present form of disclosure is merely for the purpose of illustration and that there might be devised various modifications thereof without departing from the spirit of my invention as herein set forth and claimed.

What I claim is:

1. In a tape recording device, the combination of a tape cartridge and a tape deck adapted to receive the cartridge, said cartridge containing a wound tape arranged with a tangential portion movable into inoperative position within the cartridge and movable therefrom into operative position, a sound recording and reproducing member associated with said tape deck for operative engagement with the tangential portion of the tape, said tape deck having slidable means engageable by said cartridge and adapted for movement by said cartridge forwardly and rearwardly towards and from engaged position of said cartridge, and means actuated by the sliding movement of said cartridge for automatically moving the tangential portion of the tape into and out of operative position with respect to said sound recording and reproducing member.

2. The same structure as recited in claim 1 hereof and in which there is provided spring means for holding said slidable means and cartridge in either position thereof.

3. The same structure as recited in claim 1 hereof and in which said last-named means also serves to releasably hold the cartridge in engaged position.

4. In a tape recording device, the combination of a tape cartridge and a tape deck adapted to receive the cartridge, said cartridge containing a wound tape and spaced spools about which and between which the tape extends as a substantial tangent, said cartridge including a housing means for the tangential portion of the tape when in inoperative position, resilient means for forcing said tangential portion of the tape edgewise into inoperative position within said housing means, said tape deck having a slidable plate with an upwardly projecting idler adjacent to the rear side of said tangential portion of the tape, said tape deck having associated therewith an upwardly projecting capstan drive shaft upon the opposite side of the tangential portion of the tape from said idler for operative engagement of the tape therebetween, said slidable plate having a tape pressure assembly at the rear side of the tape, said tape deck having a sound recording and reproducing member for operative engagement of the tape between the same and said pressure assembly, said slidable plate having means engageable by said cartridge for slidably moving said idler and tape pressure assembly into and out of operative position with respect to said drive shaft and said recording and reproducing member, respectively, said tape deck having means actuatable by the sliding movement of said slidable plate and cartridge towards operative position for automatically effecting movement of the tangential portion of said tape edge-wise into operative position and for releasing the tangential portion of said tape to the influence of said resilient means for returning the tangential portion of said tape to idle position within said housing means when the cartridge and slidable plate are moved to inoperative position.

5. The same structure as recited in claim 4 hereof and in which said actuatable means includes spring-actuated fingers adapted to move the tangential portion of said tape into operative position, and cam means actuatable by the sliding movement of said slidable plate for releasably holding said fingers in inoperative position and for releasing the same to the influence of the spring action thereof.

6. The same structure as recited in claim 4 hereof and in which said spools are axially movable with the tangential portion of the tape towards and from operative position, and in which said actuatable means includes spring-actuated fingers adapted to engage said spools and to move the same and the tangential portion of the tape therewith to operative position, said fingers having cam portions, and means carried by said slidable plate and adapted to engage said cam portions for rendering and holding said fingers inoperative when said sliding plate and cartridge are moved to withdrawn position and to disengage said cam portions so as to permit said spring-actuated fingers to engage said spools and thereby move the tangential portion of said tape into operative position upon forward sliding movement of said slidable plate.

7. In a tape-recording device, a tape deck adapted to receive a tape-containing cartridge, said deck comprising a fixed plate and a companion plate slidable with respect to said fixed plate, said fixed plate having a capstan drive shaft and a sound recording and reproducing member, and said slidable plate having an idler adapted for engagement with the tape in co-operation with the drive shaft and having also a pressure assembly for co-operation with said recording and reproducing member, said slidable plate having means for releasable engagement by the cartridge, and means actuatable by the movement of said slidable plate for automatically effecting movement of the tape into operative position with respect to said drive shaft and said recording and reproducing member and for holding the cartridge in operative position.

8. The same structure as recited in claim 7 hereof and in which said last-named means includes spring-actuated members for moving the tape to operative position and means for rendering said spring-actuated members effective with respect to the tape.

9. The same structure as recited in claim 7 hereof and in which said last-named means includes spring-actuated fingers on one of said plates and trip means on the other of said plates for releasing said spring-actuated fingers so as to effect movement of the tape to operative position.

10. The same structure as recited in claim 7 hereof and in which said last-named means includes spring-actuated fingers on said fixed plate adapted to engage the tape and to effect movement of the same to operative position and trip means on said slidable plate for rendering said spring-actuated fingers operative with respect to the tape.

References Cited in the file of this patent

UNITED STATES PATENTS 2,781,019 Tiger ---------------- Feb. 12, 1957